US008369356B2

(12) United States Patent
Tsai et al.

(10) Patent No.: US 8,369,356 B2
(45) Date of Patent: Feb. 5, 2013

(54) DYNAMIC MANAGEMENT OF RECEIVER RESOURCES

(75) Inventors: Ming-Chang Tsai, San Diego, CA (US); James J. Wu, San Diego, CA (US); Pillappakkam Srinivas, San Diego, CA (US); Ric Senior, San Diego, CA (US); Vinayak Chowdiah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 12/042,834

(22) Filed: Mar. 5, 2008

(65) Prior Publication Data

US 2008/0232400 A1 Sep. 25, 2008

Related U.S. Application Data

(60) Provisional application No. 60/896,040, filed on Mar. 21, 2007.

(51) Int. Cl.
*H04J 3/16* (2006.01)
(52) U.S. Cl. .......................... 370/468; 370/229; 370/431
(58) Field of Classification Search .................. 370/229, 370/312, 313, 321, 335, 342, 431, 432, 468, 370/252, 328; 375/140, 144, 147, 148, 340, 375/341, 346, 347, 267; 455/3.01, 3.04, 455/0.01
See application file for complete search history.

(56) References Cited

U.S. PATENT DOCUMENTS

| | | | |
|---|---|---|---|
| 5,390,215 A * | 2/1995 | Antia et al. .................... 375/341 |
| 5,490,165 A | 2/1996 | Blakeney, II et al. |
| 5,903,550 A * | 5/1999 | Spock ........................... 370/335 |
| 6,252,917 B1 * | 6/2001 | Freeman ....................... 375/340 |
| 6,473,467 B1 * | 10/2002 | Wallace et al. ................ 375/267 |
| 6,526,090 B1 | 2/2003 | Papasakellariou |
| 6,731,676 B2 * | 5/2004 | Rick et al. ..................... 375/148 |
| 7,031,373 B1 | 4/2006 | Iyer |
| 7,290,260 B2 | 10/2007 | Miller |

(Continued)

FOREIGN PATENT DOCUMENTS

| | | |
|---|---|---|
| EP | 1071223 A2 * | 1/2001 |
| JP | 8508152 T | 8/1996 |
| JP | 2001-211079 | 8/2001 |
| JP | 2001211079 | 8/2001 |
| JP | 2005150904 A | 6/2005 |
| WO | WO9512262 | 5/1995 |

OTHER PUBLICATIONS

Harry Newton, Newton's Telecom Dictionary, 22nd Updated and Expanded Edition, ISBN 1-57820-319-8, cover page, copyright page and p. 936.*

(Continued)

*Primary Examiner* — Andrew Lai
(74) *Attorney, Agent, or Firm* — Donald C. Kordich

(57) ABSTRACT

Techniques for dynamically managing receiver resources to achieve good latency and throughput performance are described. A receiver may have various types of receiver resources such as demod resources for demodulating packets, decode resources for decoding packets, packet processing resources, etc. These various types of receiver resources may be dynamically assigned to packets. In one design, receiver resource usage by each packet to be processed by the receiver may be estimated. The available receiver resources may be assigned to packets based on the estimated receiver resource usage by each packet and one or more assignment criteria such as priority, latency requirements, etc. The latency of each packet may be determined based on the receiver resource assignment. If the latency requirements of any packet are not met, then receiver processing may be skipped or deferred for one or more packets such that the latency requirements of each packet to be processed can be met.

33 Claims, 12 Drawing Sheets

U.S. PATENT DOCUMENTS

| | | | | |
|---|---|---|---|---|
| 2002/0141339 A1* | 10/2002 | Konuma | ................... | 370/229 |
| 2003/0161390 A1* | 8/2003 | Teague et al. | ................ | 375/148 |
| 2006/0063482 A1* | 3/2006 | Ko et al. | ................... | 455/3.01 |
| 2006/0153119 A1* | 7/2006 | Ramanna et al. | ............. | 370/328 |
| 2008/0037612 A1* | 2/2008 | Tudosoiu | ................... | 375/147 |

OTHER PUBLICATIONS

International Search Report—PCT/US08/057692, International Search Authority—European Patent Office—Sep. 3, 2008.

Written Opinion—PCT/US08/057692, International Search Authority—European Patent Office—Sep. 3, 2008.

TIA-1121.001, "Physical Layer for Ultra Mobile Broadband (UMB) Air Interface Specification," 3GPP2 C.S0084-001 Version 2.0 (Aug. 2007).

International Preliminary Report on Patentability & Written Opinion—PCT/US2008/057692, International Search Authority—European Patent Office—Sep. 22, 2009.

* cited by examiner

DYNAMIC MANAGEMENT OF RECEIVER RESOURCES

The present application claims priority to provisional U.S. Application Ser. No. 60/896,040, entitled "DYNAMIC RECEIVER RESOURCE MANAGEMENT FOR BROADBAND DATA MODEMS," filed Mar. 21, 2007, assigned to the assignee hereof and incorporated herein by reference in its entirety.

BACKGROUND

I. Field

The present disclosure relates generally to communication, and more specifically to techniques for managing receiver resources.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may transmit a large amount of data to a terminal. A broadband receiver at the terminal may demodulate and decode the transmission received from the base station to recover the data sent to the terminal. The receiver may have limited resources for demodulation and decoding of the received transmission. The amount of time that the receiver takes to process the received transmission and recover the data is referred to as the latency of the receiver. The latency and throughput of the receiver may be dependent on various factors such as the amount of available receiver resources, the amount of data sent to the terminal, how the data is sent to the terminal, etc. In general, it is desirable to process the received transmission as efficiently as possible with the available receiver resources and also as quickly as possible in order to meet latency and throughput requirements.

SUMMARY

Techniques for dynamically managing receiver resources in order to achieve good latency and throughput performance are described herein. A receiver may have various types of receiver resources such as demodulation (demod) resources for demodulating packets, decode resources for decoding packets, packet processing resources, etc. These various types of receiver resources may be dynamically assigned to packets, e.g., on a frame-by-frame basis.

In one design of dynamic receiver resource management, receiver resource usage by each of at least one packet to be processed by the receiver may be estimated. Demod resource usage by each packet may be estimated based on the amount of bandwidth and/or the amount of time used for the packet, the number of tiles used for the packet, the number of layers via which the packet is sent, the modulation order for the packet, etc. Decode resource usage by each packet may be estimated based on the packet length, the number of decoding iterations to perform for the packet, the coding scheme used for the packet, etc.

The available receiver resources may be assigned to the at least one packet based on the estimated receiver resource usage by each packet and one or more assignment criteria. In one design, the available receiver resources may be assigned to the at least one packet in a sequential order, which may be determined based on the priority of each packet, the latency requirements of each packet, etc. The available demod resources may be assigned to the at least one packet based on the number of tiles used for each packet. The available decode resources may be assigned to the at least one packet based on packet size, the number of subpackets for each packet, the likelihood of correctly decoding each subpacket, etc. The latency of each packet may be determined based on the initial receiver resource assignment. If the latency requirements of any packet are not met, then receiver processing (e.g., demodulation and/or decoding) may be skipped or deferred for one or more packets/subpackets such that the latency requirements of each packet to be processed can be met. The receiver may then be dispatched to process the at least one packet as indicated by the initial or revised receiver resource assignment.

Various aspects and features of the disclosure are described in further detail below.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2C.S0084-001, entitled "Physical Layer for Ultra Mobile Broadband (UMB) Air Interface Specification," August 2007, which is publicly available.

Figure 1:
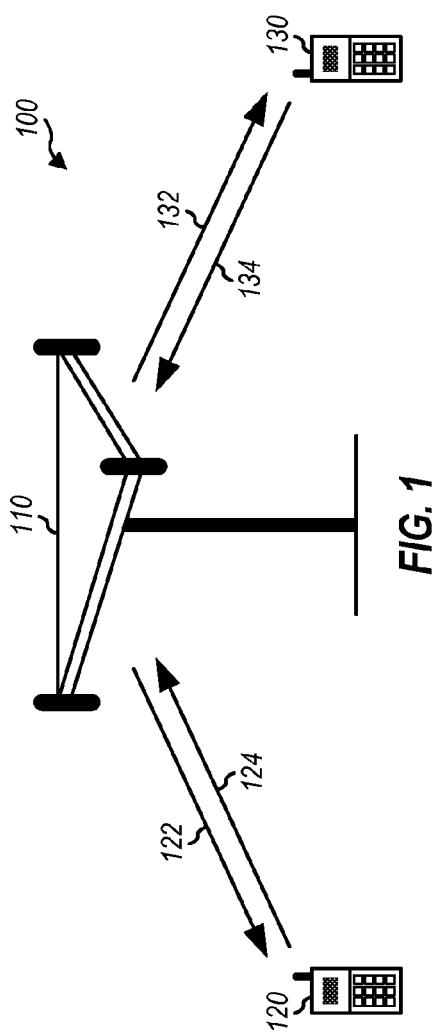
FIG. 1 shows a wireless communication system.

FIG. 1 shows a wireless communication system 100, which may also be referred to as an access network (AN). For simplicity, only one base station 110 and two terminals 120 and 130 are shown in FIG. 1. A base station is a station that communicates with the terminals. A base station may also be referred to as an access point, a Node B, an evolved Node B, etc. A terminal may be stationary or mobile and may also be referred to as an access terminal (AT), a mobile station, a user equipment, a subscriber unit, a station, etc. A terminal may be a cellular phone, a personal digital assistant (PDA), a wireless communication device, a wireless modem, a handheld device, a laptop computer, a cordless phone, etc. A terminal may communicate with a base station on the forward and/or reverse links. The forward link (or downlink) refers to the communication link from the base station to the terminal, and the reverse link (or uplink) refers to the communication link from the terminal to the base station. In FIG. 1, terminal 120 may receive data from base station 110 via forward link 122 and may transmit data via reverse link 124. Terminal 130 may receive data from base station 110 via forward link 132 and may transmit data via reverse link 134. The techniques described herein may be used to receive data on the forward link as well as the reverse link.

The system may support transmission of data in packets. A packet may have a variable size, which may be dependent on various factors such as the amount of data to send, the amount of radio resources available to send the packet, channel conditions, etc. In one design, a packet may be partitioned into $N_{SP}$ subpackets, where $N_{SP} \geq 1$ and may be determined as follows:

$$N_{SP} = \left\lceil \frac{\text{Packet Size}}{\text{Maximum Subpacket Size}} \right\rceil, \quad \text{Eq (1)}$$

where "⌈ ⌉" denotes a ceiling operator. The maximum subpacket size may be a fixed value defined by the system. Each subpacket may be encoded separately by a transmitter and decoded separately by a receiver. In another design, subpackets are not used, and each packet may be encoded and decoded separately. The techniques described herein are applicable for both designs and may be applied regardless of whether packets or subpackets are encoded and decoded separately. However, for clarity, much of the description below is for the design in which a packet is partitioned into $N_{SP}$ subpackets.

The system may support hybrid automatic retransmission (HARQ). For HARQ on the forward link, a base station may send one or more transmissions for a subpacket until the subpacket is decoded correctly by a terminal, or the maximum number of transmissions has been sent, or some other termination condition is encountered. HARQ may improve reliability of data transmission.

Figure 2:
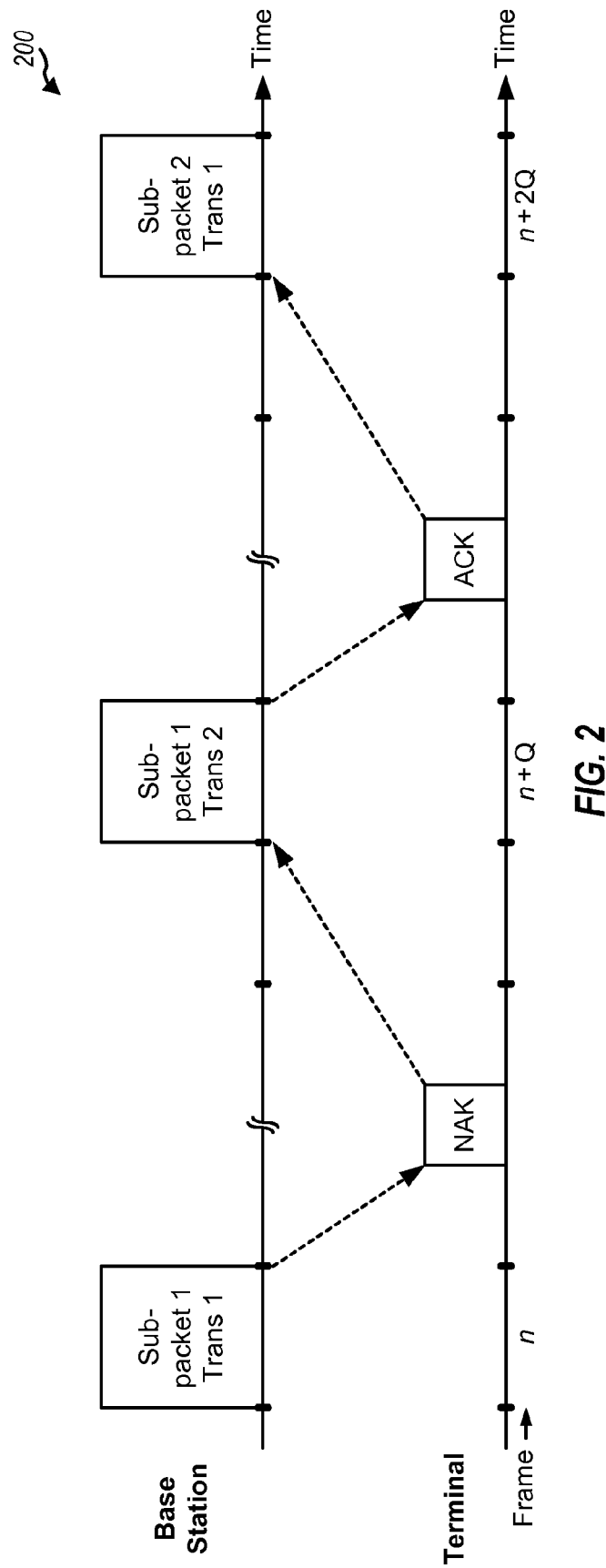
FIG. 2 shows data transmission on the forward link with HARQ.

FIG. 2 shows data transmission on the forward link with HARQ. Base station 110 may process subpacket 1 and send a first HARQ transmission (Trans 1) for subpacket 1 in frame n. An HARQ transmission is a transmission for one subpacket in one frame. Terminal 120 may receive the first HARQ transmission, decode subpacket 1 in error, and send a negative acknowledgment (NAK). Base station 110 may receive the NAK and send a second HARQ transmission (Trans 2) for subpacket 1 in frame n+Q, where Q may be a fixed or configurable value. Terminal 120 may receive the second HARQ transmission, decode subpacket 1 correctly based on the first and second HARQ transmissions, and send an acknowledgement (ACK). Base station 110 may receive the ACK and process and send subpacket 2 in similar manner.

Q HARQ interlaces may be defined, with each HARQ interlace including frames that are spaced apart by Q frames. Base station 110 may transmit multiple subpackets in parallel on up to Q HARQ interlaces to terminal 120, with each subpacket being sent on one HARQ interlace. One or more HARQ transmissions may be sent for each subpacket on the HARQ interlace used for that packet. Each subpacket may be processed (e.g., encoded and modulated) such that it can be decoded correctly with a target number of HARQ transmissions, which may be 2, 3, 4, etc.

The system may utilize orthogonal frequency division multiplexing (OFDM) and/or single-carrier frequency division multiplexing (SC-FDM). OFDM and SC-FDM partition the system bandwidth into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the number of subcarriers may be dependent on the system bandwidth.

Figure 3:
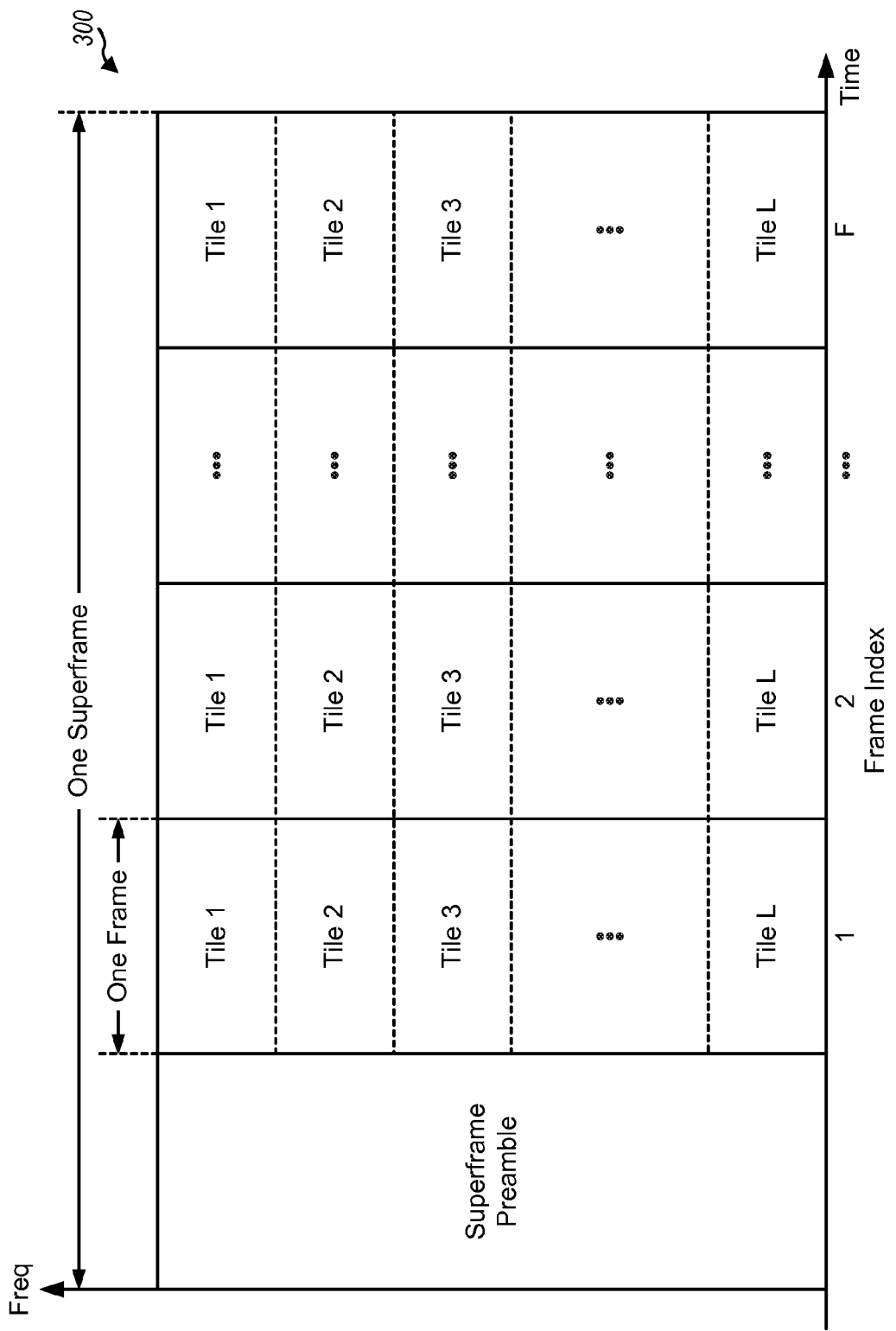
FIG. 3 shows a frame structure.

FIG. 3 shows a design of a superframe structure 300 that may be used for the forward link. The transmission timeline may be partitioned into units of superframes. Each superframe may span a particular time duration, which may be fixed or configurable. Each superframe may include a preamble followed by F frames, where F may be any integer value. Each frame may cover $N_{FRAME}$ OFDM symbol periods, where $N_{FRAME}$ may be equal to 4, 6, or 8 or some other value. The superframe preamble may carry system information and acquisition pilots. Each frame may carry traffic data, control information/signaling, pilot, etc.

The time frequency resources available for the forward link may be partitioned into tiles. A tile is a block of time frequency resources and may be referred to as a resource block, a time frequency block, etc. A tile may cover any time and frequency dimension, which may be fixed or configurable. In one design, a tile covers 16 subcarriers in one frame. Each frame may include L tiles, where L may be dependent on the total number of subcarriers ($N_{FFT}$).

Figure 4:
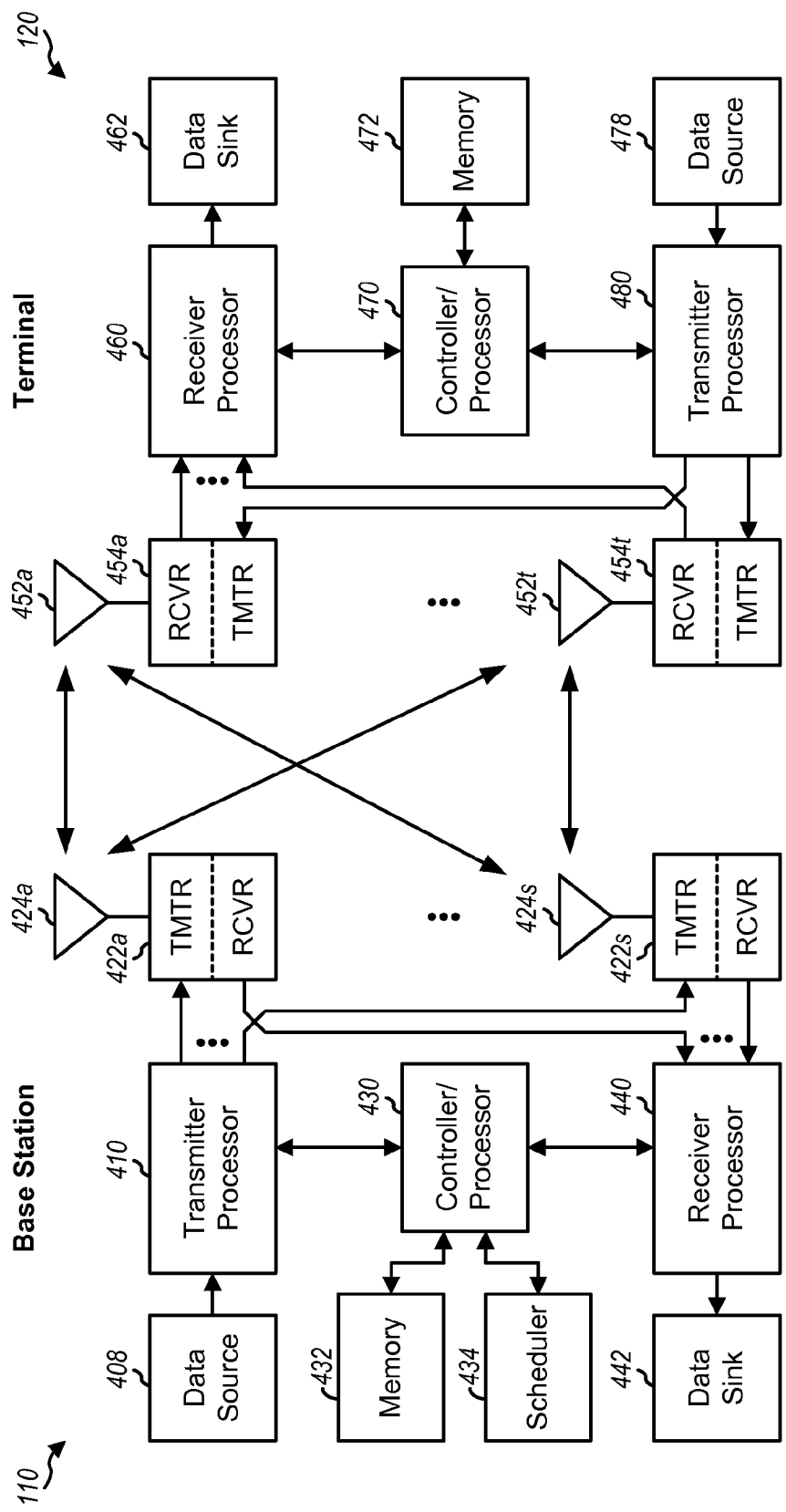
FIG. 4 shows a block diagram of a base station and a terminal.

FIG. 4 shows a block diagram of a design of base station 110 and terminal 120 in FIG. 1. In this design, base station 110 is equipped with S antennas 424a through 424s, and terminal 120 is equipped with T antennas 452a through 452t, where in general $S \geq 1$ and $T \geq 1$. Base station 110 and terminal 120 may support single-input single-output (SISO), single-input multiple-output (SIMO), multiple-input single-output (MISO), and/or multiple-input multiple-output (MIMO) transmission.

On the forward link, at base station 110, a transmitter processor 410 may receive packets of data for terminal 120 from a data source 408 and may partition the packets into subpackets. Transmitter processor 410 may then process (e.g., encode and modulate) each subpacket to obtain a corresponding output subpacket and may map output subpackets to tiles assigned to terminal 120. Transmitter processor 410 may also map pilot symbols to the assigned tiles, perform MIMO processing if applicable, and provide S output symbol streams to S transmitter units (TMTR) 422a through 422s.

Each transmitter unit 422 may process its output symbol stream (e.g., for OFDM) to obtain an output chip stream. Each transmitter unit 422 may further condition (e.g., convert to analog, filter, amplify, and upconvert) its output chip stream and generate a forward link signal. S forward link signals from transmitter units 422a through 422s may be transmitted from S antennas 424a through 424s, respectively.

At terminal 120, T antennas 452a through 452t may receive the forward link signals from base station 110, and each antenna 452 may provide a received signal to an associated receiver unit (RCVR) 454. Each receiver unit 454 may condition (e.g., filter, amplify, downconvert, and digitize) its received signal to obtain samples, process the samples (e.g., for OFDM) to obtain received symbols, and provide the received symbols to a receiver processor 460. Receiver processor 460 may perform demodulation for received symbols in the tiles assigned to terminal 120, demap subpackets from the assigned tiles, decode each subpacket, perform packet processing, and provide decoded packets to a data sink 462. In general, the processing by receiver processor 460 is complementary to the processing by transmitter processor 410 at base station 110.

On the reverse link, at terminal 120, a transmitter processor 480 may receive packets from a data source 478, partition the packets into subpackets, encode each subpacket to obtain an output subpacket, and map output subpackets to tiles assigned to terminal 120 for uplink transmission. Transmitter processor 480 may also map pilot symbols in the assigned tiles, perform spatial processing if applicable, and provide T output symbol streams. Transmitter units 454a through 454t may process the T output symbol streams to obtain T reverse link signals, which may be transmitted via antennas 452a through 452t. At base station 110, the reverse link signals from terminal 120 may be received by antennas 424a through 424s, processed by receiver units 422a through 422s, and further processed by a receiver processor 440 to recover the packets transmitted by terminal 120.

Controllers/processors 430 and 470 may direct the operation at base station 110 and terminal 120, respectively. Memories 432 and 472 may store data and program codes for base station 110 and terminal 120, respectively. A scheduler 434 may schedule terminal 120 for data transmission on the forward and/or reverse link and may assign radio resources, e.g., tiles, for data transmission.

A receiver processor may also be referred to as a receiver, a broadband receiver, a broadband data modem, etc., and these various terms may be used interchangeably. In general, a receiver processor may include resources for any set of functions such as demodulation, decoding, packet processing, etc. A receiver processor may also include any amount of resources for each function, which may be fixed or configurable. In one design, a receiver processor may include a fixed amount of resources for each function, e.g., a fixed number of processing engines for each function. In another design, a receiver processor may include a fixed amount of resources (e.g., a fixed number of processing engines) that may be configured to perform different functions. In this design, the receiver processor may be configured to have different amounts of resources for different functions depending on the processing to be performed. For clarity, much of the description below is for the design in which the receiver processor includes a fixed amount of resources for each function.

Figure 5:
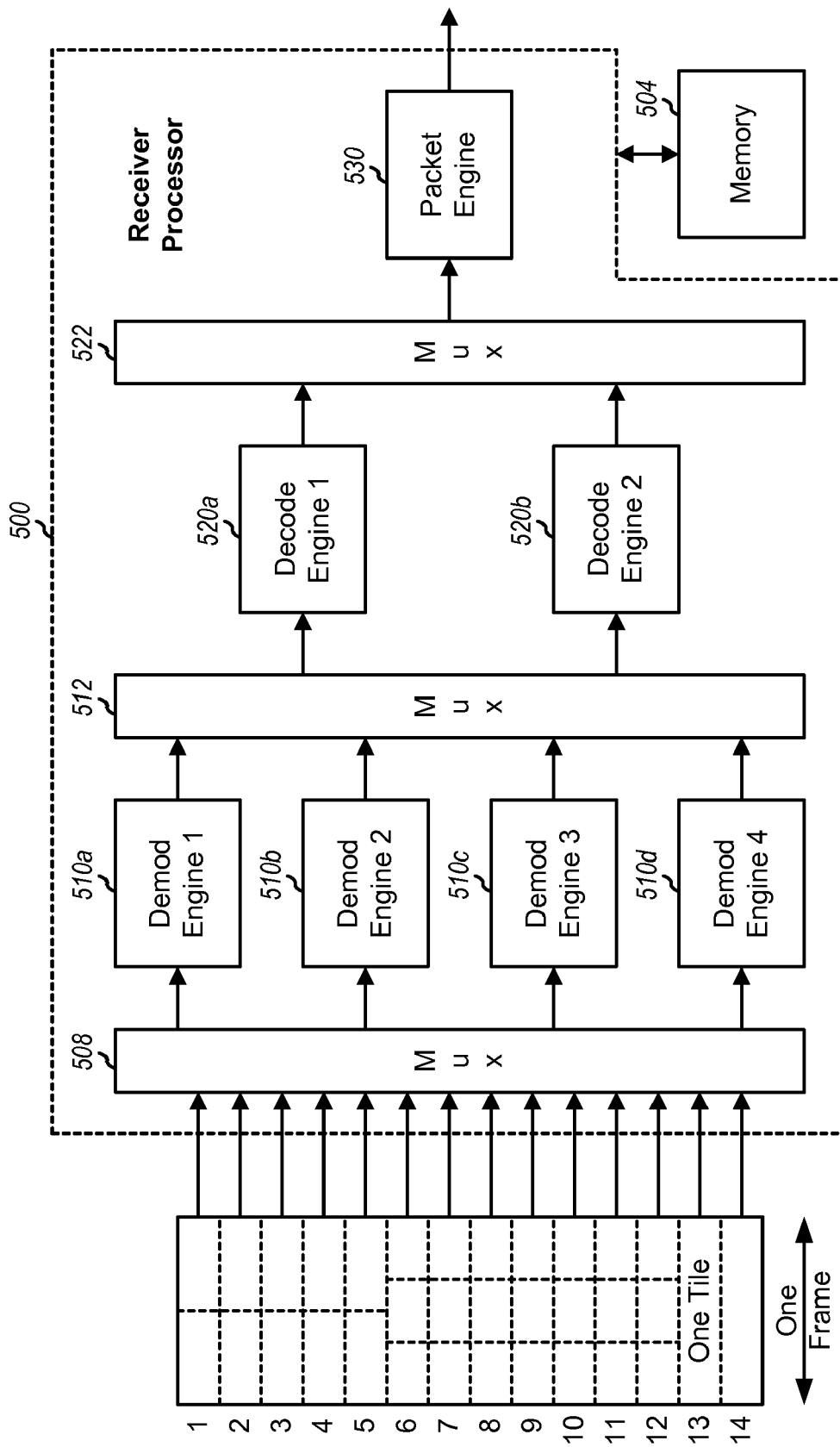
FIG. 5 shows a block diagram of a receiver processor.
Figure 6:
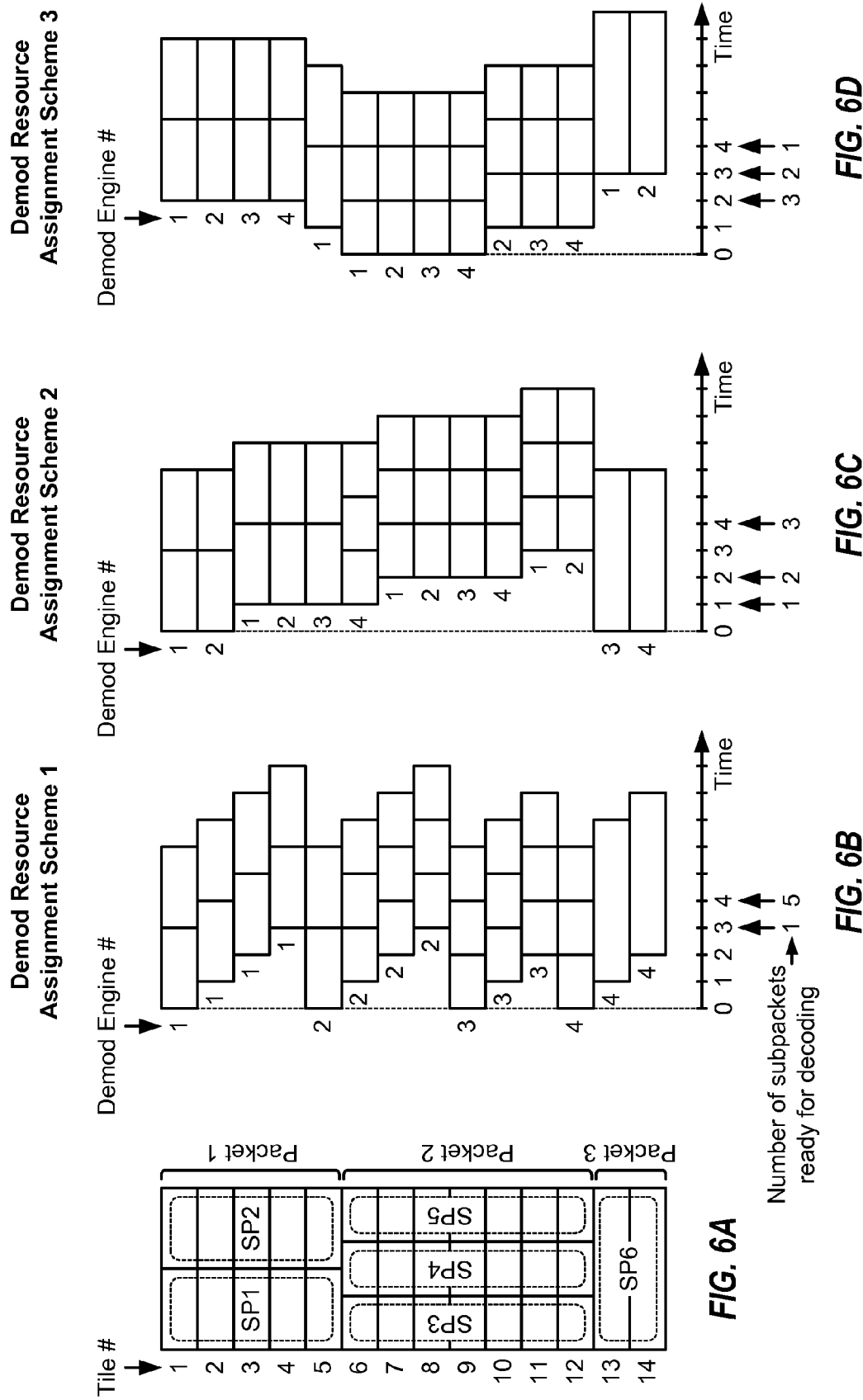
FIG. 6A shows transmission of three packets in 14 tiles.
FIG. 6B shows assignment of tiles approximately evenly to demod engines.
FIG. 6C shows assignment of tiles to demod engines based on packet size from smallest to largest.
FIG. 6D shows assignment of tiles to demod engines based on packet size from largest to smallest.

FIG. 5 shows a block diagram of a design of a receiver processor 500, which may be used for each of receiver processors 440 and 460 in FIG. 4. In this design, receiver processor 500 includes four demodulation (demod) engines 510a through 510d, two decode engines 520a and 520b, and one packet engine 530. Demod engines 510a through 510d are also referred to as demod engines 1 through 4, and decode engines 520a and 520b are also referred to as decode engines 1 and 2 in the description below. In general, a receiver processor may include any number of engines for each function. A receiver processor may also include engines for other functions not shown in FIG. 5.

Within receiver processor 500, a multiplexer (Mux) 508 may obtain received symbols from all assigned tiles and may provide the received symbols from each tile to a demod engine 510 assigned to that tile. In one design, each demod engine 510 may start processing one new tile in each time unit and may process multiple tiles in a pipeline manner, as described below. Demod engines 510a through 510d may process up to four tiles in parallel. Each demod engine 510 may perform tasks such as descrambling, channel estimation, MIMO detection, coherent detection, log-likelihood ratio (LLR) computation, etc.

A multiplexer 512 may obtain demodulated symbols from all demod engines 510a through 510d and may provide demodulated symbols for each subpacket to a decode engine 520 assigned to that subpacket. In one design, each decode engine 520 may decode one subpacket at a time and may start on a new subpacket when a pending subpacket has been decoded. Decode engines 520a and 520b may decode up to two subpackets in parallel. Each decode engine 520 may perform tasks such as combining, demapping, deinterleaving, decoding, CRC checking, etc.

A multiplexer 522 may obtain decoded subpackets from both decode engines 520a and 520b and may provide decoded subpackets for each packet to packet engine 530. In one design, packet engine 530 may process one packet at a time and may start processing a packet whenever all decoded subpackets for that packet are received. Packet engine 530 may perform tasks such as reassembly, duplicate detection, routing, etc.

FIG. 5 shows a specific design of receiver processor 500. Receiver processor 500 may also be implemented with other designs and may include a different number of engines for each function. A memory 504 may store data and program codes for receiver processor 500.

The latency of a packet is the amount of time it takes a receiver processor to process the packet. Different receiver processors may have different latencies for the same transmitted data due to differences in their configurations and capabilities. On the other hand, a given receiver processor may have different latencies for the same amount of different data due to differences in bandwidth allocation and data segmentation. This may be illustrated by the following example.

FIGS. 6A through 6D show three schemes for assigning four demod engines to demodulate a transmission of three packets in 14 tiles. In the following example, the demodulation time is assumed to be the same for each tile. A demod engine can start processing a new tile in each time unit, which may be of any suitable duration. All subpackets of a packet are ready for decoding once all tiles used for that packet have been processed for at least one time unit.

FIG. 6A shows an example transmission of three packets in 14 tiles. In this example, packet 1 is partitioned into two subpackets (which are labeled as SP1 and SP2) and sent in five tiles 1 through 5. Packet 2 is partitioned into three subpackets (which are labeled as SP3, SP4 and SP5) and sent in seven tiles 6 through 12. Packet 3 is partitioned into one subpacket (which is labeled as SP6) and sent in two tiles 13 and 14. For clarity, FIG. 6A shows each subpacket occupying a different portion of each tile used for the packet to which that subpacket belongs. To achieve diversity, all subpackets of each packet may be distributed across each tile used for that packet.

FIG. 6B shows a first demod resource assignment scheme in which tiles used for packets are assigned to the demod engines as evenly as possible. In the example shown in FIG. 6B, the first four tiles 1 through 4 are assigned to demod engine 1, the next four tiles 5 through 8 are assigned to demod engine 2, the next three tiles 9 through 11 are assigned to demod engine 3, and the last three tiles 12 through 14 are assigned to demod engine 4.

The demod processing timeline is partitioned into time units and marked by times 0, 1, 2, 3, 4, etc., where time n is n time units from time 0. Demod engine 1 processes tile 1 starting at time 0, then processes tile 2 starting at time 1, then processes tile 3 starting at time 2, and then processes tile 4 starting at time 3. Demod engine 2 similarly processes tiles 5, 6, 7 and 8 starting at times 0, 1, 2 and 3, respectively. Demod engine 3 processes tiles 9, 10 and 11 starting at times 0, 1 and 2, respectively. Demod engine 4 processes tiles 12, 13 and 14 starting at times 0, 1 and 2 respectively.

For the example shown in FIG. 6B, packet 3 with one subpacket is processed by demod engine 4 and is ready for decoding after three time units. Packet 1 with two subpackets is processed by demod engines 1 and 2 and is ready for decoding after four time units. Packet 2 with three subpackets is processed by demod engines 2, 3 and 4 and is also ready for decoding after four time units. The demodulation latencies of packets 3, 1 and 2 are thus 3, 4 and 4 time units, respectively.

FIG. 6C shows a second demod resource assignment scheme in which tiles used for packets are assigned to the demod engines based on packet size from smallest to largest. At time 0, demod engines 3 and 4 are assigned with tiles 13 and 14 for the smallest packet 3, and demod engines 1 and 2 are assigned with tiles 1 and 2 for the second smallest packet 1. At time 1, demod engines 1, 2 and 3 are assigned with tiles 3, 4 and 5 for packet 1, and demod engine 4 is assigned with tile 6 for the largest packet 2. At time 2, demod engines 1, 2, 3 and 4 are assigned with tiles 7, 8, 9 and 10 for packet 2. At time 3, demod engines 1 and 2 are assigned with tiles 11 and 12 for packet 2.

For the example shown in FIG. 6C, packet 3 is processed by demod engines 3 and 4 and is ready for decoding after one time unit. Packet 1 is processed by demod engines 1, 2, 3 and 4 and is ready for decoding after two time units. Packet 2 is processed by demod engines 1, 2, 3 and 4 and is ready for decoding after four time units. The demodulation latencies of packets 3, 1 and 2 are thus 1, 2 and 4 time units, respectively.

FIG. 6D shows a third demod resource assignment scheme in which tiles used for packets are assigned to the demod engines based on packet size from largest to smallest, which is opposite of the second scheme in FIG. 6C. At time 0, demod engines 1, 2, 3 and 4 are assigned with tiles 6, 7, 8 and 9 for the largest packet 2. At time 1, demod engine 1 is assigned with tile 5 for the second largest packet 1, and demod engines 2, 3 and 4 are assigned with tiles 10, 11 and 12 for packet 2. At time 2, demod engines 1, 2, 3 and 4 are assigned with tiles 1, 2, 3 and 4 for packet 1. At time 3, demod engines 1 and 2 are assigned with tiles 13 and 14 for the smallest packet 3.

For the example shown in FIG. 6D, packet 2 is processed by demod engines 1 through 4 and is ready for decoding after two time units. Packet 1 is processed by demod engines 1 through 4 and is ready for decoding after three time units. Packet 3 is processed by demod engines 1 and 2 and is ready for decoding after four time units. The demodulation latencies of packets 2, 1 and 3 are thus 2, 3 and 4 time units, respectively.

Table 1 summarizes the demodulation latencies of packets 1, 2 and 3 for the three demod resource assignment schemes described above. As shown in Table 1, the manner in which demod resources are assigned to tiles affects the demodulation latencies of the packets sent in the tiles.

TABLE 1

| | Demodulation Latencies | | | |
|---|---|---|---|---|
| Packet | Scheme 1 | Scheme 2 | Scheme 3 | Unit |
| 1 | 4 | 2 | 3 | time units |
| 2 | 4 | 4 | 2 | time units |
| 3 | 3 | 1 | 4 | time units |

Decode engines 1 and 2 may be assigned to decode the subpackets as soon as they are available from demod engines 1 through 4. The packet engine may be assigned to process each packet as soon as all subpackets for that packet are decoded. In the following example, the decoding time for each subpacket is equal to the subpacket length. The packet processing time for each packet is equal to the packet length. Subpackets 1 and 2 have lengths of 2.0 time units. Subpackets 3, 4 and 5 have lengths of 2.5 time units. Subpacket 6 has a length of 1.5 time units.

Figure 7:
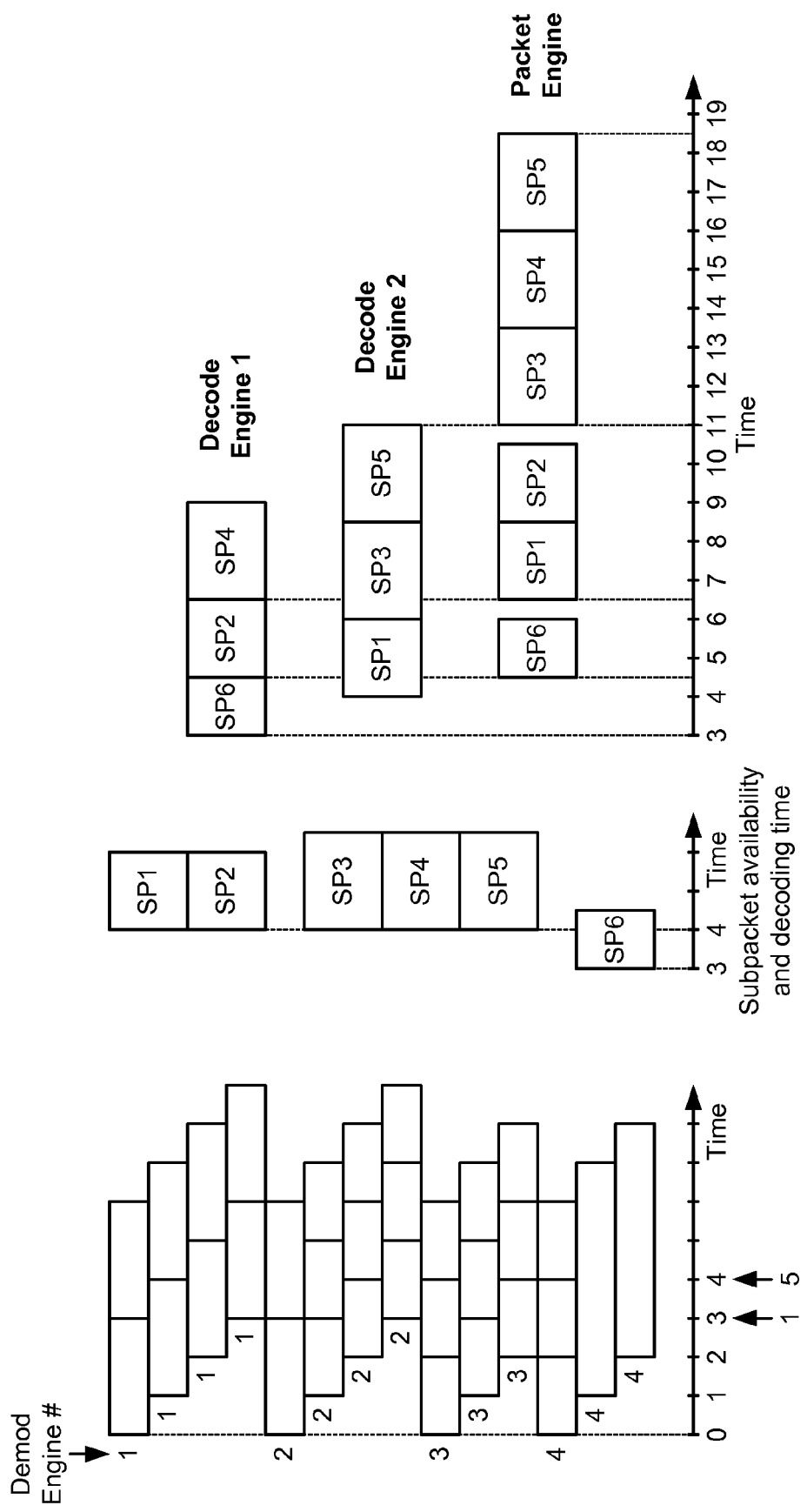
FIG. 7 shows decoding and packet processing for the assignment in FIG. 6B.

FIG. 7 shows an example of decoding and packet processing for packets 1, 2 and 3 with the first demod resource assignment scheme. Subpacket 6 is available for decoding at time 3, and subpackets 1 through 5 are available for decoding at time 4, as discussed above for FIG. 6B. Subpackets 6, 2 and 4 are assigned to decode engine 1, and subpackets 1, 3 and 5 are assigned to decode engine 2. Decode engine 1 decodes subpacket 6 from time 3 to time 4.5, decodes subpacket 2 from time 4.5 to time 6.5, and decodes subpacket 4 from time 6.5 to time 9. Decode engine 2 decodes subpacket 1 from time 4 to time 6, decodes subpacket 3 from time 6 to time 8.5, and decodes subpacket 5 from time 8.5 to time 11.

Packet 3 with only subpacket 6 is available for packet processing at time 4.5. Packet 1 with two subpackets 1 and 2 is available for packet processing at time 6.5. Packet 2 with three subpackets 3, 4 and 5 is available for packet processing at time 11. The packet engine processes packet 6 from time 4.5 to time 6, processes packet 1 from time 6.5 to time 10.5, and processes packet 2 from time 11 to time 18.5. The overall latencies of packets 3, 1 and 2 are thus 6, 10.5 and 18.5 time units, respectively.

Figure 8:
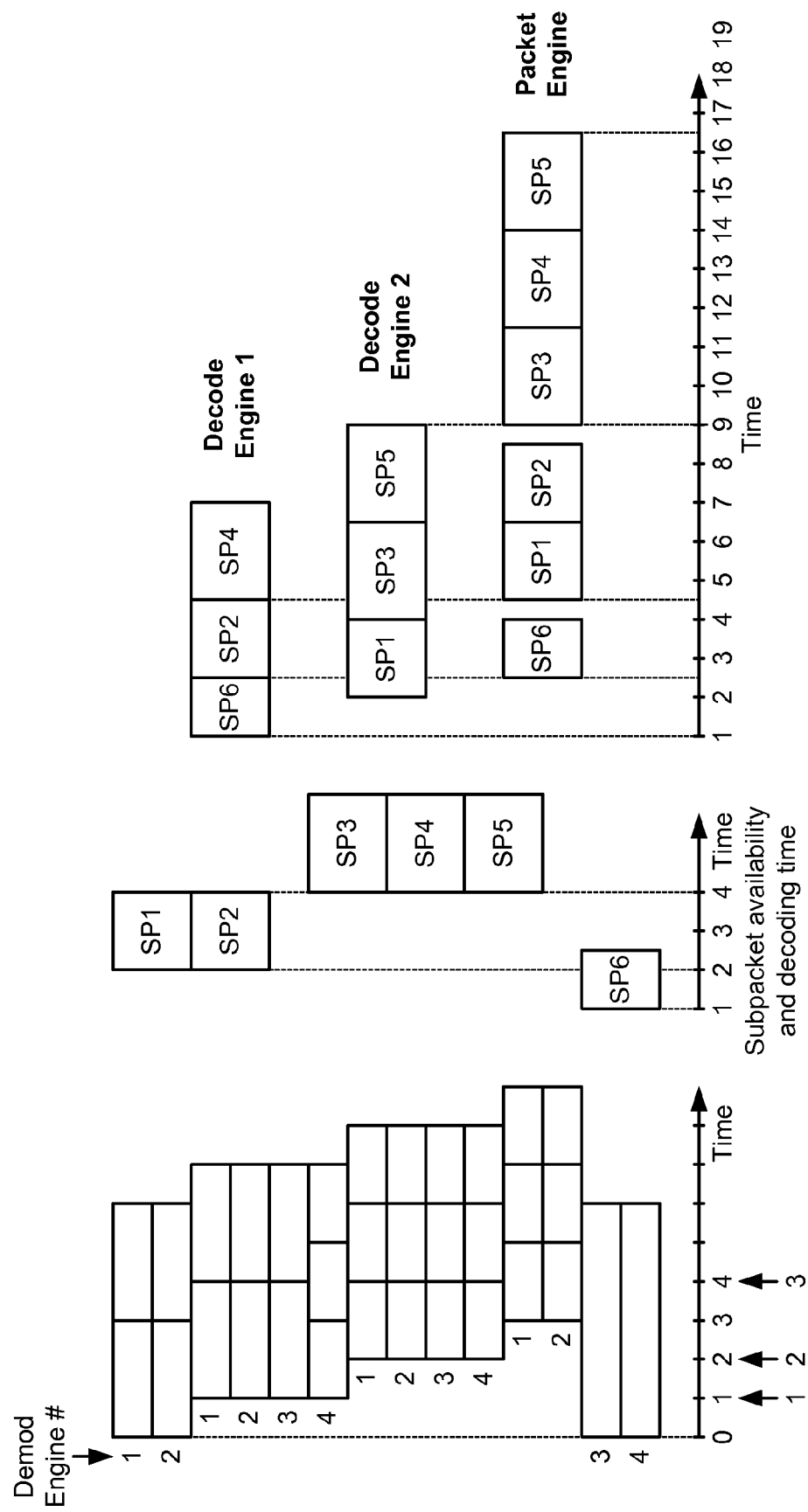
FIG. 8 shows decoding and packet processing for the assignment in FIG. 6C.

FIG. 8 shows an example of decoding and packet processing for packets 1, 2 and 3 with the second demod resource assignment scheme. Subpacket 6 is available for decoding at time 1, subpackets 1 and 2 are available for decoding at time 2, and subpackets 3, 4 and 5 are available for decoding at time 4, as discussed above for FIG. 6C. Subpackets 6, 2 and 4 are assigned to decode engine 1, and subpackets 1, 3 and 5 are assigned to decode engine 2. Decode engine 1 decodes subpacket 6 from time 1 to time 2.5, decodes subpacket 2 from time 2.5 to time 4.5, and decodes subpacket 4 from time 4.5 to time 7. Decode engine 2 decodes subpacket 1 from time 2 to time 4, decodes subpacket 3 from time 4 to time 6.5, and decodes subpacket 5 from time 6.5 to time 9.

Packet 3 with only subpacket 6 is available for packet processing at time 2.5. Packet 1 with two subpackets 1 and 2 is available for packet processing at time 4.5. Packet 2 with three subpackets 3, 4 and 5 is available for packet processing at time 9. The packet engine processes packet 6 from time 2.5 to time 4, processes packet 1 from time 4.5 to time 8.5, and processes packet 2 from time 9 to time 16.5. The overall latencies of packets 3, 1 and 2 are thus 4, 8.5 and 16.5 time units, respectively.

Figure 9:
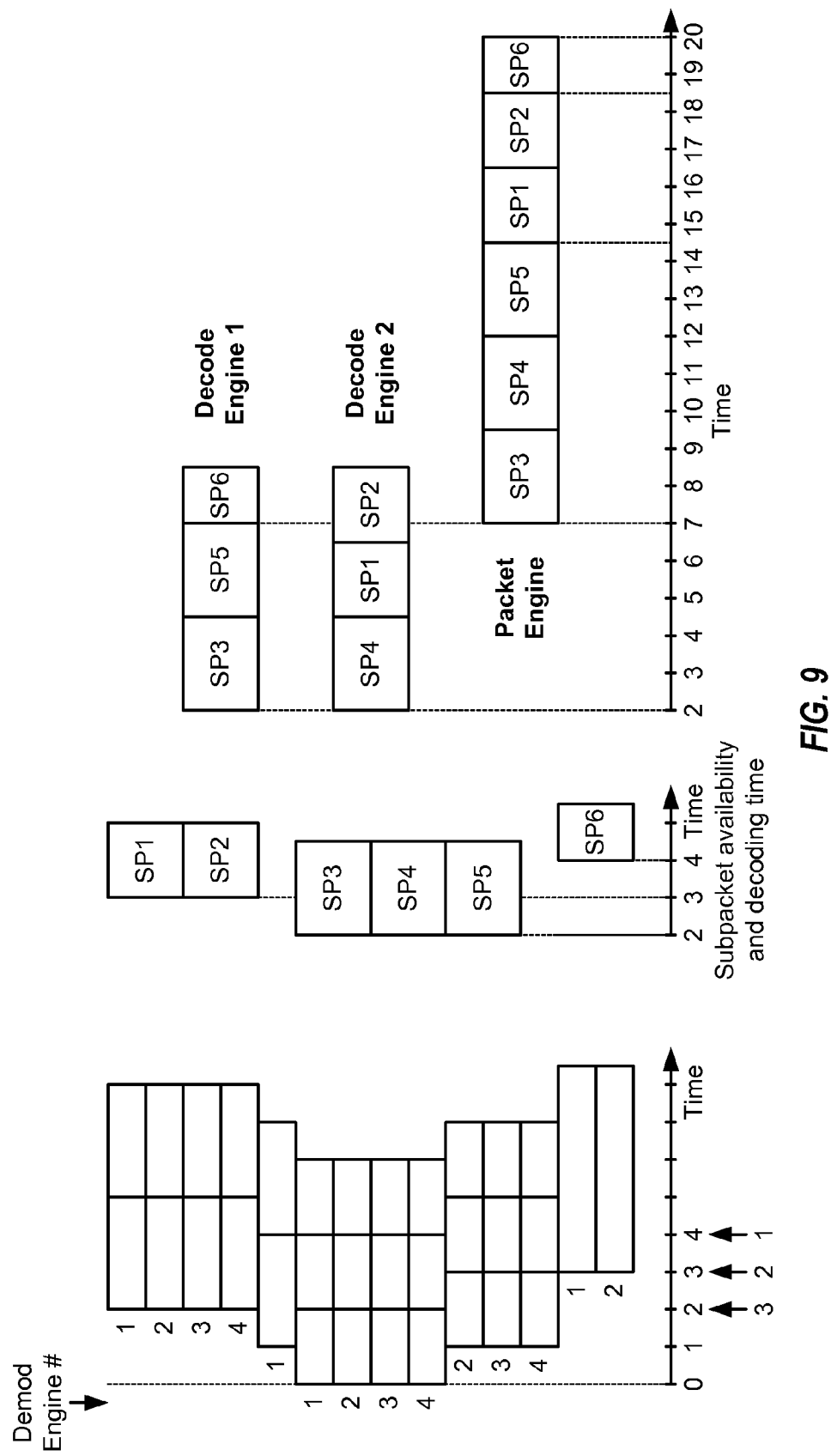
FIGS. 9 and 10 show two examples of decoding and packet processing for the assignment in FIG. 6D.

FIG. 9 shows an example of decoding and packet processing for packets 1, 2 and 3 with the third demod resource assignment scheme. Subpackets 3, 4 and 5 are available for decoding at time 2, subpackets 1 and 2 are available for decoding at time 3, and subpacket 6 is available for decoding at time 4, as discussed above for FIG. 6D. Subpackets 3, 5 and 6 are assigned to decode engine 1, and subpackets 4, 1 and 2 are assigned to decode engine 2. Decode engine 1 decodes subpacket 3 from time 2 to time 4.5, decodes subpacket 5 from time 4.5 to time 7, and decodes subpacket 6 from time 7 to time 8.5. Decode engine 2 decodes subpacket 4 from time 2 to time 4.5, decodes subpacket 1 from time 4.5 to time 6.5, and decodes subpacket 2 from time 6.5 to time 8.5.

Packet 2 with three subpackets 3, 4 and 5 is available for packet processing at time 7. Packet 1 with two subpackets 1 and 2 is available for packet processing at time 8.5. Packet 3 with only subpacket 6 is available for packet processing at time 8.5. The packet engine processes packet 2 from time 7 to time 14.5, processes packet 1 from time 14.5 to time 18.5, and processes packet 3 from time 18.5 to time 20. The overall latencies of packets 2, 1 and 3 are thus 14.5, 18.5 and 20 time units, respectively.

Figure 10:
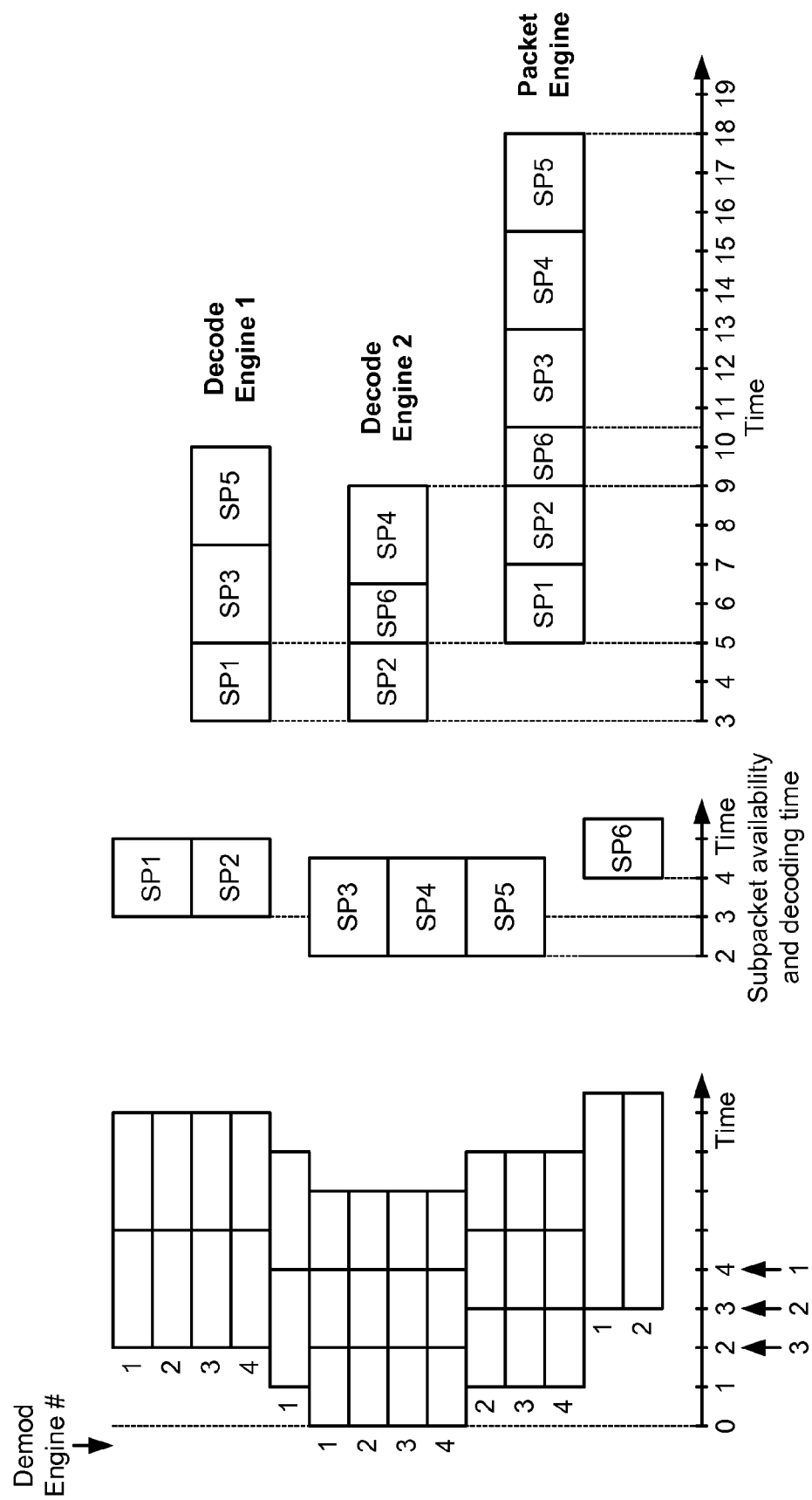

FIG. 10 shows another example of decoding and packet processing for packets 1, 2 and 3 with the third demod resource assignment scheme. In this example, subpackets 1, 3 and 5 are assigned to decode engine 1, and subpackets 2, 6 and 4 are assigned to decode engine 2. Decode engine 1 decodes subpacket 1 from time 3 to time 5, decodes subpacket 3 from time 5 to time 7.5, and decodes subpacket 5 from time 7.5 to time 10. Decode engine 2 decodes subpacket 2 from time 3 to time 5, decodes subpacket 6 from time 5 to time 6.5, and decodes subpacket 4 from time 6.5 to time 9. The packet engine processes packet 1 from time 5 to time 9, processes packet 3 from time 9 to time 10.5, and processes packet 2 from time 10.5 to time 18. The overall latencies of packets 1, 3 and 2 are thus 9, 10.5 and 18 time units, respectively. FIGS. 9 and 10 show that different overall latencies may be obtained and that the overall latency may be potentially reduced by changing the assignment of decode resources.

Table 2 summarizes the overall latencies of packets 1, 2 and 3 for the four examples shown in FIGS. 7 through 10. As shown in Table 2, the manner in which decode resources are assigned to packets affects the overall latencies of the packets.

TABLE 2

Overall Latencies

| Packet | FIG. 7 | FIG. 8 | FIG. 9 | FIG. 10 | Unit |
|---|---|---|---|---|---|
| 1 | 10.5 | 8.5 | 18.5 | 9 | time units |
| 2 | 18.5 | 16.5 | 14.5 | 18 | time units |
| 3 | 6 | 4 | 20 | 10.5 | time units |

As shown in FIGS. 6A through 10 and Table 2, different assignments of the three packets to the four demod engines and the two decode engines result in different overall latencies for these packets, even though the decoding and the packet processing latencies are kept to a minimum. One observation is that the example shown in FIG. 8 has the shortest overall latency of 16.5 time units as well as the shortest demodulation latencies of 1, 2, 4 time units. In contrast, the example shown in FIG. 9 has the longest overall latency of 20 time units.

In general, the throughput-latency performance bound of a receiver processor may not be clear with all things considered. This uncertainty in the performance bound may be further complicated by the fact that not all receiver operations are always necessary, and different receiver operations may have different levels of impact to throughput-latency performance when omitted. The implication is that the minimum resources required for the receiver processor to meet certain throughput-latency performance may not be well defined. Typical solutions to this problem include (1) coming close to but not intending to meet advertised performance, (2) guaranteeing to meet the advertised performance by over-budgeting receiver resources, and (3) guaranteeing to meet the advertised performance with sufficient back-off built-in. All of these solutions may be undesirable for various reasons.

In an aspect, receiver resources may be dynamically managed to allow a receiver (e.g., a receiver processor, a broadband data modem, etc.) with any configuration and capability to perform close to its practical throughput-latency performance bound. Dynamic receiver resource management may entail dynamically assigning or allocating the available receiver resources (e.g., on a frame-by-frame basis) based on data processing requirements. Dynamic receiver resource management may attempt to limit and/or reduce latency, subject to quality of service (QoS) requirements, with as little impact to throughput as possible.

Figure 11:
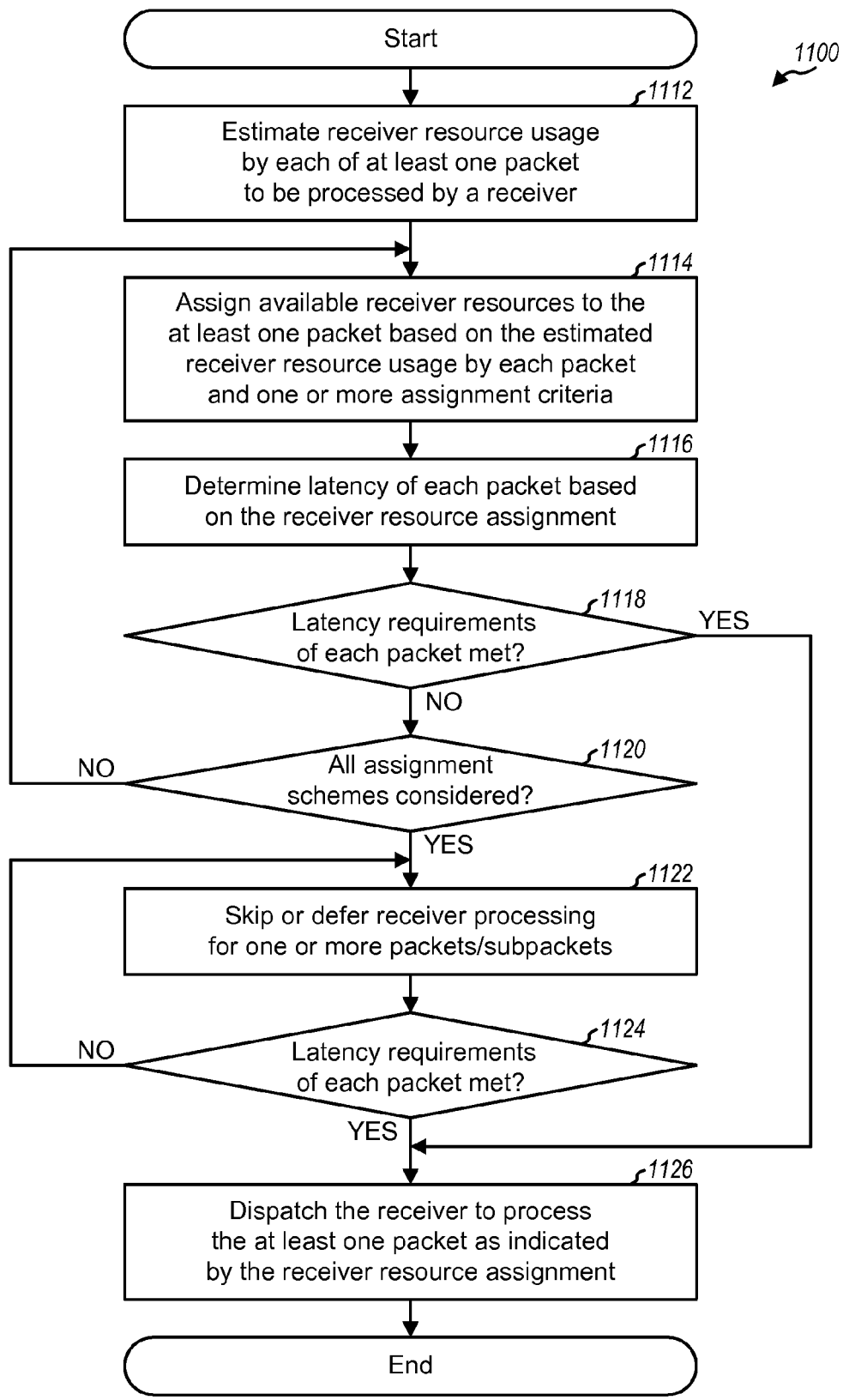
FIG. 11 shows a process for dynamically managing receiver resources.

FIG. 11 shows a design of a process 1100 for dynamically managing receiver resources. Initially, receiver resource usage by each of at least one packet to be processed by a receiver may be estimated (block 1112). The receiver resource usage by each packet is an amount of receiver resources to use to process the packet. The receiver resource usage by each packet may include (i) demod resource usage, which is an amount of demod resources to use to demodulate the packet, (ii) decode resource usage, which is an amount of decode resources to use to decode the packet, (iii) packet processing resource usage, and/or (iv) other resource usage.

The available receiver resources may be assigned to the at least one packet based on the estimated receiver resource usage by each packet and one or more assignment criteria (block 1114). The available receiver resources may be assigned based on latency requirements, priority, and/or other parameters of each packet. The latency of each packet may be determined based on the receiver resource assignment (block 1116).

A determination may then be made whether the latency of each packet meets the latency requirements of that packet (block 1118). If the answer is 'Yes', then the receiver may be dispatched to process the at least one packet as indicated by the receiver resource assignment (block 1126). Otherwise, if the answer is 'No' for block 1118, then a determination may be made whether all possible assignment schemes have been considered (block 1120). If the answer is 'No', then the process returns to block 1114, and the available receiver resources may be assigned to the at least one packet based on the receiver resource usage by each packet and one or more assignment criteria. Blocks 1114 through 1120 may be performed in a systematic manner. Blocks 1114 through 1120 may attempt to successively go through different receiver stages to assign receiver resources to each packet, to accumulate latency through the receiver stages, and to reduce latency with respect to QoS requirements.

If the answer is 'Yes' for block 1120, then receiver processing (e.g., demodulation and/or decoding) may be skipped or deferred for one or more packets/subpackets, as described below (block 1122). A determination may then be made whether the latency of each packet meets the latency requirements of that packet (block 1124). If the answer is 'Yes', then the receiver may be dispatched to process the at least one packet as indicated by the receiver resource assignment (block 1126). Otherwise, if the answer is 'No' for block 1124, then the process returns to block 1122 to skip or defer one or more additional packets/subpackets, to prioritize the receiver operations in other manners, etc. Blocks 1122 and 1124 may be performed iteratively until each packet to be processed is within its latency bound, the available receiver resources are assigned as efficiently as possible, and a 'Yes' is obtained for block 1124.

For block 1112, the demod resource usage by each packet may be estimated based on various factors such as the amount of bandwidth and/or the amount of time used for the packet, the number of tiles used for the packet, the number of layers via which the packet is sent, the modulation order for the packet, etc. A layer is a spatial dimension. Data may be sent via multiple layers simultaneously for MIMO transmission. Modulation order is related to the number of bits sent in each modulation symbol. In general, more demod resources may be used for more bandwidth, longer time allocation, more tiles, more layers, and higher modulation order.

The decode resource usage by each packet may be estimated based on various factors such as the packet length or size, the number of subpackets for the packet and the subpacket lengths, the number of decoding iterations to perform for the packet, the coding scheme used for the packet, etc. In general, more decode resources may be used for longer packet length and more iterations.

For block 1114, the available demod resources may be assigned to the at least one packet based on any one of the three demod resource assignment schemes described above or some other demod resource assignment scheme. The available demod resources may comprise a predetermined number of demod engines operable in parallel and/or other processing units. The available decode resources may be assigned to the at least one packet based on any decode resource assignment scheme. The available decode resources may comprise a predetermined number of decode engines operable in parallel and/or other processing units.

In general, the available receiver resources may be assigned based on one or more criteria. In one design, the available receiver resources may be assigned to the at least one packet in a sequential order determined based on the priority of each packet. A packet with the highest priority may be assigned receiver resources first, and a packet with the lowest priority may be assigned receiver resources last. In another design, the available receiver resources may be assigned to the at least one packet in a sequential order determined based on latency requirements. A packet with the shortest latency requirements or greatest latency sensitivity (e.g., a packet for Voice-over-IP (VoIP)) may be assigned receiver resources first, and a packet with the longest latency requirements or least latency sensitivity (e.g., a packet for web surfing) may be assigned receiver resources last. These designs may mitigate performance degradation due to limited amount of receiver resources.

In one design, the available decode resources may be assigned to subpackets based on the likelihood of correctly decoding each subpacket. Each subpacket may be transmitted such that it can be decoded with a target probability of success for a target number of HARQ transmissions. The likelihood of correctly decoding a subpacket may be related to the number of HARQ transmissions received for that subpacket. Subpackets may be assigned decode resources based on the number of HARQ transmissions received for each subpacket. For example, a subpacket with the most number of HARQ transmissions may be selected for decoding first, and a subpacket with the least number of HARQ transmissions may be selected for decoding last. This may ensure efficient utilization of the available decode resources when the decode resource usage of all subpackets exceeds the available decode resources.

In one design, packets may be selected for decoding based on the number of subpackets for each packet and/or packet size. A packet with the fewest number of subpackets and/or the shortest length may be selected for decoding last, and a packet with the most number of subpackets and/or the longest length may be selected for decoding first. The packets may also be selected for decoding from smallest packet to largest packet. This design may reduce latencies of packets, improve packet throughput, and/or provide other benefits.

In one design, the available demod resources may be assigned to packets based on the number of tiles used for each packet. In one design, a packet with the fewest number of tiles may be selected for demodulation last, and a packet with the most number of tiles may be selected for demodulation first. The packets may also be selected for demodulation from the fewest to most number of tiles. In another design, one of K1 tiles used for a packet may be selected for demodulation instead of one of K2 tiles used for a packet, where K1>K2. These designs may reduce latencies of packets, improve packet throughput, and/or provide other benefits.

In general, demod resources and decode resources may be assigned to packets in any manner with goals of reducing latency and improving throughput, subject to any cross-layer QoS constraints. In certain scenarios, demodulating and decoding smaller packets first may result in shorter latency, if the decoding is successful. With HARQ, demodulating and decoding larger packets first may free up more radio resources for transmission and processing in the next frame. Computer simulation and/or other analysis may be performed to determine latency and throughput performance for different resource assignment schemes in different scenarios. For each scenario, the resource assignment scheme that provides the best performance may be selected for use.

For block 1122, receiver processing for one or more packets/subpackets may be skipped or deferred so that each packet to be processed can meet its QoS requirements. The packet/subpacket(s) to skip or defer may be selected in various manners.

In one design, decoding for one or more packets/subpackets may be skipped or deferred based on latency requirements and/or priorities of all packets/subpackets to be processed. A packet with the least latency sensitivity and/or lowest priority (e.g., a packet for web surfing) may be skipped or deferred instead of a packet with greater latency sensitivity and/or greater priority (e.g., a packet for VoIP).

In another design, decoding for one or more packets/subpackets may be skipped or deferred based on the likelihood of correctly decoding each subpacket. For HARQ, subpackets may be skipped or deferred based on the number of HARQ transmissions received for each subpacket. For example, a subpacket with the least number of HARQ transmissions may be skipped or deferred.

In yet another design, decoding for one or more packets/subpackets may be skipped or deferred based on the number of subpackets for each packet and/or packet size. For example, one subpacket in a packet with L1 subpackets may be skipped or deferred instead of one subpacket in a packet with L2 subpackets, where L1<L2.

In one design, demodulation for one or more tiles may be skipped or deferred based on the number of tiles used for each packet. For example, a packet sent in the most number of tiles may be skipped or deferred. As another example, one of N1 tiles used for a packet may be skipped or deferred instead of one of N2 tiles used for a packet, where N1>N2.

Receiver processing for one or more packets/subpackets may also be skipped or deferred based on other criteria. In general, criteria such as latency requirements, priorities, decoding probability, number of HARQ transmissions, number of subpackets per packet, packet size, and number of tiles per packet may be used to assign the available receiver resources to packets in block 1114 and/or to select one or more packets/subpackets to skip or defer receiver processing in block 1122. In one design, the available receiver resources may be assigned to one packet at a time in a sequential order, which may be determined based on any one or more of the criteria given above.

Figure 12:
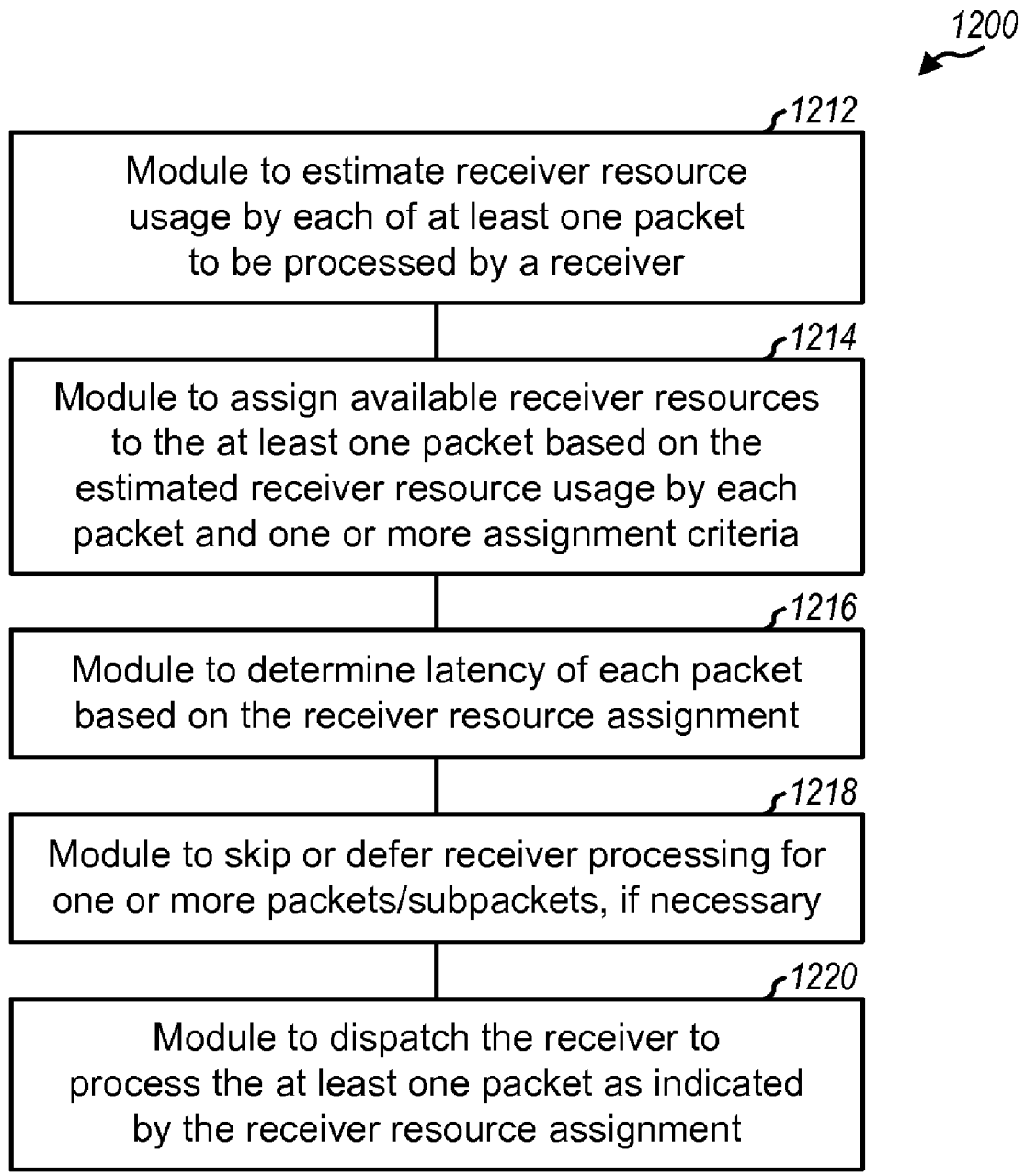
FIG. 12 shows an apparatus for dynamically managing receiver resources.

FIG. 12 shows a design of an apparatus 1200 for dynamically managing receiver resources. Apparatus 1200 includes means for estimating receiver resource usage by each of at least one packet to be processed by a receiver (module 1212), means for assigning available receiver resources to the at least one packet based on the estimated receiver resource usage by each packet and one or more assignment criteria (module 1214), means for determining the latency of each packet based on the receiver resource assignment (module 1216), means for skipping or deferring receiver processing for one or more packets/subpackets, if necessary (module 1218), and means for dispatching the receiver to process the at least one packet as indicated by the receiver resource assignment (module 1220).

The modules in FIG. 12 may comprise processors, electronics devices, hardware devices, electronics components, logical circuits, memories, etc., or any combination thereof.

Figure 13:
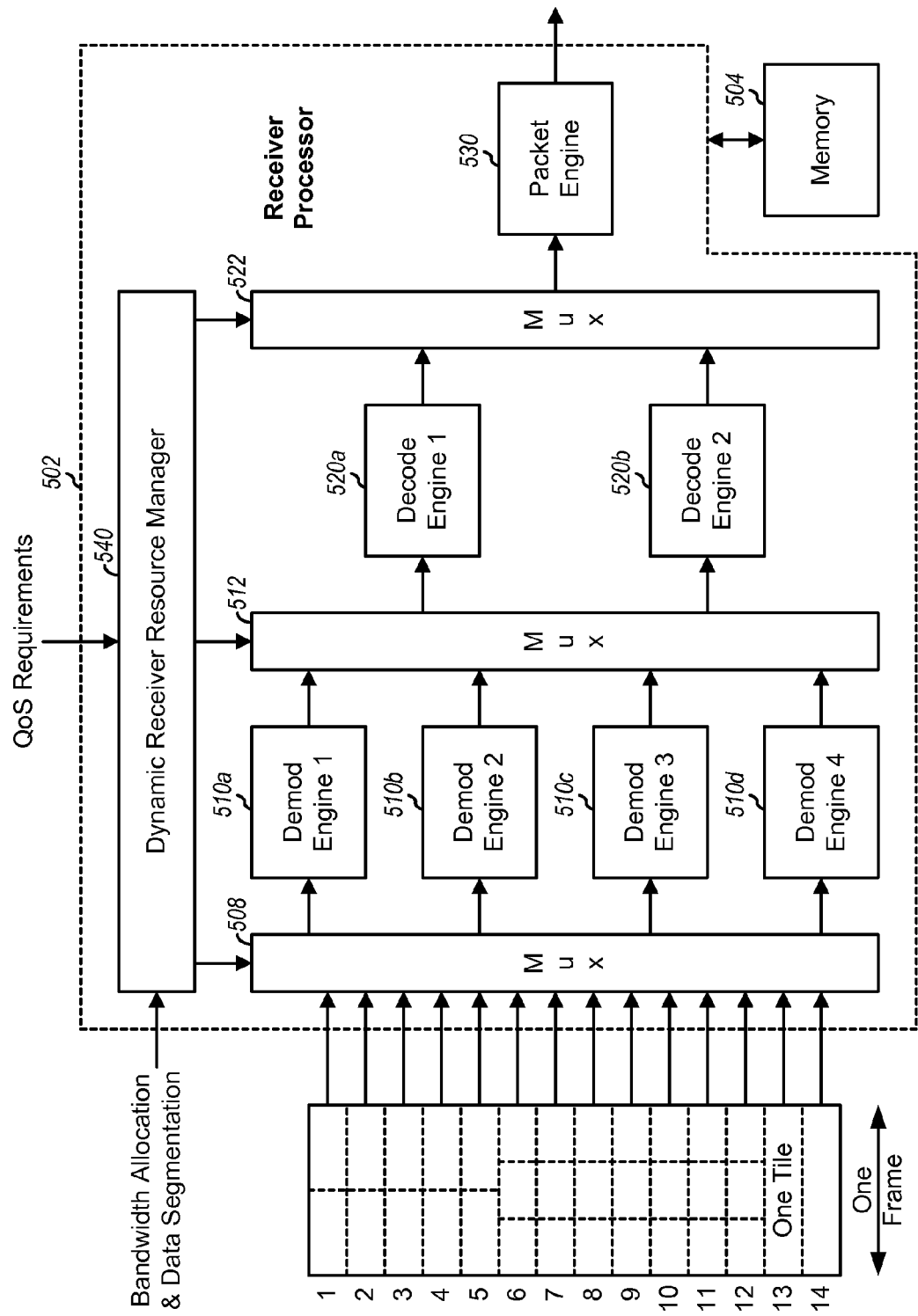
FIG. 13 shows a block diagram of a receiver processor with dynamic receiver resource management.

FIG. 13 shows a block diagram of a design of a receiver processor 502, which may be used for each of receiver processors 440 and 460 in FIG. 4. Receiver processor 502 includes all of the engines and multiplexers in receiver processor 500 in FIG. 5. Receiver processor 502 further includes a dynamic receiver resource manager 540. Manager 540 may receive inputs such as bandwidth allocation information (e.g., the assigned tiles), data segmentation information (e.g., the subpackets and packets sent in the assigned tiles), QoS requirements (e.g., latency requirements), and/or other information (e.g., priority of each packet). Manager 540 may assign or allocate the available receiver resources to packets to be processed based on the received information and in accordance with any of the schemes described above. Manager 540 may implement process 1100 in FIG. 11 and/or other processes for dynamic allocation of the available receiver resources to the packets.

Dynamic management of receiver resources may provide the following advantages:
  Achieve minimum possible latency from the receiver when the desired throughput can be supported by the available receiver resources,
  Otherwise, maintain QoS-bound latency from the receiver with maximum possible throughput,
  Ensure cost-effective utilization of the available receiver resources with as little waste as possible, and
  Allow cross-layer QoS to be extended into physical layer processing.

Dynamic receiver resource management may allow for effective allocation and utilization of the available receiver resources for high throughput and low latency. Dynamic receiver resource management may ensure that all usage is properly handled for best practical throughput-latency performance without the need to know the absolute worst-case operating scenario. Dynamic receiver resource management may achieve higher throughput and/or lower latency, subject to QoS requirements, for a wide range of applications including more conventional ones such as low-bandwidth low-latency VoIP, high-bandwidth medium-latency Video-on-Demand (VoD), high-bandwidth low-latency Video Telephony (VT), and any-bandwidth high-latency web surfing, as well as future applications that may arise due to availability of high bandwidth with broadband receiver. Dynamic receiver resource management may allow for efficient utilization of the available receiver resources for all operating scenarios and for any mix of simultaneous applications. Dynamic receiver resource management may be applied to any wireless or wireline receiver design and implementation, which may be based on a multi-stage, multi-thread and/or multi-processor architecture capable of handling multi-stream and/or multi-user operation.

The techniques described herein may be implemented by various means. For example, these techniques may be implemented in hardware, firmware, software, or a combination thereof. For a hardware implementation, the processing units used to perform the techniques (e.g., receiver processor 502 in FIG. 13) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 432 or 472 in FIG. 4) and executed by a processor (e.g., processor 430 or 470). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for managing receiver resources, comprising:
  at least one processor configured to estimate receiver resource usage by each of at least one packet, the receiver resource usage by each packet being an amount of receiver, resources to use to process each packet based at least on one of an amount of bandwidth used to receive each packet, a number of tiles within each packet, a number of layers of each packet, and a modulation order for each packet, and to assign available receiver resources to the at least one packet based on the estimated receiver resource usage by each packet, wherein the assignment of the available receiver resources to the at least one packet is made according to one of a plurality of assignment schemes, and wherein the one of the plurality of assignment schemes is selected based on the estimated receiver resource usage by each packet; and a memory coupled to the at least one processor.

2. The apparatus of claim 1, wherein the available receiver resources comprise demod resources, and wherein the at least one processor is configured to estimate demod resource usage by each packet, the demod resource usage being an amount of demod resources to use to demodulate each packet, and to assign available demod resources to the at least one packet based on the estimated demod resource usage by each packet.

3. The apparatus of claim 2, wherein each packet is sent in at least one tile, and wherein the at least one processor is configured to estimate the demod resource usage by each packet based on number of tiles used for each packet.

4. The apparatus of claim 2, wherein the available demod resources comprise multiple demod engines operable in parallel.

5. The apparatus of claim 4, wherein the at least one packet is sent in multiple tiles, and wherein the at least one processor is configured to assign the multiple demod engines with approximately equal number of tiles.

6. The apparatus of claim 4, wherein the at least one processor is configured to assign the multiple demod engines to the at least one packet based on packet size from smallest to largest.

7. The apparatus of claim 4, wherein the at least one processor is configured to assign the multiple demod engines to the at least one packet based on packet size from largest to smallest.

8. The apparatus of claim 1, wherein the available receiver resources comprise decode resources, and wherein the at least one processor is configured to estimate decode resource usage by each packet, the decode resource usage being an amount of decode resources to use to decode each packet, and to assign available decode resources to the at least one packet based on the estimated decode resource usage by each packet.

9. The apparatus of claim 8, wherein the at least one processor is configured to estimate the decode resource usage by each packet based on at least one of packet size and number of decoding iterations for each packet.

10. The apparatus of claim 8, wherein each packet comprises at least one subpacket, and wherein the at least one processor is configured to estimate the decode resource usage by each packet based on number of subpackets for each packet.

11. The apparatus of claim 8, wherein the at least one processor is configured to assign the available decode resources to the at least one packet in a sequential order based on probability of correct decoding for each packet, starting with a packet having highest probability of correct decoding.

12. The apparatus of claim 8, wherein the at least one packet comprises a, plurality of subpackets, and wherein the at least one processor is configured to assign the available decode resources to the plurality of subpackets based on number of transmissions received for each subpacket.

13. The apparatus of claim 8, wherein the available decode resources comprise multiple decode engines operable in parallel.

14. The apparatus of claim 1, wherein the available receiver resources comprise packet processing resources, and wherein the at least one processor is configured to estimate packet processing resource usage by each packet, the packet processing resource usage being an amount of packet processing resources to use to process each packet, and to assign available packet processing resources to the at least one packet based on the estimated packet processing resource usage by each packet.

15. The apparatus of claim 1, wherein the at least one processor is configured to assign the available receiver resources to the at least one packet in a sequential order based on latency requirements of each packet, starting with a packet having shortest latency requirements or greatest latency sensitivity.

16. The apparatus of claim 1, wherein the at least one processor is configured to assign the available receiver resources to the at least one packet in a sequential order based on priority of each packet, starting with a packet having highest priority.

17. The apparatus of claim 1, wherein the at least one processor is configured to skip or defer processing of one or more packets among the at least one packet to allow each packet to be processed to meet requirements of each packet, and to select the one or more packets to skip or defer processing based on at least one of latency requirements, priority, likelihood of correct decoding, number of transmissions, number of tiles, and size of each packet.

18. A method of managing receiver resources, comprising:
estimating, by at least one processor, receiver resource usage by each of at least one packet, the receiver resource usage by each packet being an amount of receiver resources to use to process each packet based at least on one of an amount of bandwidth used to receive each packet, a number of tiles within each packet, a number of layers of each packet, and a modulation order for each packet; and assigning, by the at least one processor, available receiver resources to the at least one packet based on the estimated receiver resource usage by each packet, wherein the assignment of the available receiver resources to the at least one packet is made according to one of a plurality of assignment schemes, and wherein the one of the plurality of assignment schemes is selected based on the estimated receiver resource usage by each packet.

19. The method of claim 18, wherein the estimating receiver resource usage comprises estimating demod resource usage by each packet, the demod resource usage being an amount of demod resources to use to demodulate each packet, and wherein the assigning available receiver resources comprises assigning available demod resources to the at least one packet based on the estimated demod resource usage by each packet.

20. The method of claim 18, wherein the estimating receiver resource usage comprises estimating decode resource usage by each packet, the decode resource usage being an amount of decode resources to use to decode each packet, and wherein the assigning available receiver resources comprises assigning available decode resources to the at least one packet based on the estimated decode resource usage by each packet.

21. The method of claim 20, wherein the estimating decode resource usage by each packet comprises estimating the decode resource usage by each packet based on at least one of packet size, number of decoding iterations, and number of subpackets for each packet.

22. The method of claim 18, wherein the assigning available receiver resources comprises assigning the available receiver resources to the at least one packet in a sequential order based on latency requirements or priority of each packet, starting with a packet having shortest latency requirements or highest priority.

23. The method of claim 18, further comprising
skipping or deferring processing of one or more packets among the at, least one packet to allow each packet to be processed to meet requirements of each packet; and
selecting the one or more packets to skip or defer processing based on at least one of latency requirements, priority, likelihood of correct decoding, number of transmissions, number of tiles, and size of each packet.

24. An apparatus for managing receiver resources, comprising:
means for estimating receiver resource usage by each of at least one packet, the receiver resource usage by packet being an amount of receiver resources to use to process each packet based at least on one of an amount of bandwidth used to receive each packet, a number of tiles within each packet, a number of layers of each packet, and a modulation order for each packet; and
means for assigning available receiver resources to the at least one packet based on the estimated receiver resource usage by each packet, wherein the assignment of the available receiver resources to the at least one packet is made according to one of a plurality of assignment schemes, and wherein the one of the plurality of assignment schemes is selected based on the estimated receiver resource usage by each packet.

25. The apparatus of claim 24, wherein the means for estimating receiver resource usage comprises means for estimating demod resource usage by each packet, the demod resource usage being an amount of demod resources to use to demodulate the each packet, and wherein the means for assigning available receiver resources comprises means for assigning available demod resources to the at least one packet based on the estimated demod resource usage by each packet.

26. The apparatus of claim 24, wherein the means for estimating receiver resource usage comprises means for estimating decode resource usage by each packet, the decode resource usage being an amount of decode resources to use to decode each packet, and wherein the means for assigning available receiver resources comprises means for assigning available decode resources to the at least one packet based on the estimated decode resource usage by each packet.

27. The apparatus of claim 26, wherein the means for estimating decode resource usage by each packet comprises means for estimating the decode resource usage by each packet based on at least one of packet size, number of decoding iterations, and number of subpackets for each packet.

28. The apparatus of claim 24, wherein the means for assigning available receiver resources comprises means for assigning the available receiver resources to the at least one packet in a sequential order based on latency requirements, or priority of each packet, starting with a packet having shortest latency requirements, or highest priority.

29. The apparatus of claim 24, further comprising
means for skipping or deferring processing of one or more packets among the at least one packet to allow each packet to be processed to meet requirements of each packet; and
means for selecting the one or more packets to skip or defer processing based on at least one of latency requirements, priority, likelihood of correct decoding, number of transmissions, number of tiles, and size of each packet.

30. A computer program product, comprising:
a non-transitory computer-readable medium comprising:
code for causing at least one computer to estimate receiver resource usage by each of at least one packet, the receiver resource usage by each packet being an amount of receiver resources to use to process each packet based at least on one of an amount of bandwidth used to receive each packet, a number of tiles within each packet, a number of layers of each packet, and a modulation order for each packet; and
code for causing the at least one computer to assign available receiver resources to the at least one packet based on the estimated receiver resource usage by each packet, wherein the assignment of the available receiver resources to the at least one packet is made according to one of a plurality of assignment schemes, and wherein the one of the plurality of assignment schemes is selected based on the estimated receiver resource usage by each packet.

31. The computer program product of claim 30, wherein the computer-readable medium further comprises:
code for causing the at least one computer to estimate demod resource usage by each packet, the demod resource usage being an amount of demod resources to use to demodulate each packet; and
code for causing the at least one computer to assign available demod resources to the at least one packet based on the estimated demod resource usage by each packet.

32. The computer program product of claim 30, wherein the computer-readable medium further comprises:
code for causing the at least one computer to estimate decode resource usage by each packet, the decode resource usage being an amount of decode resources to use to decode each packet; and
code for causing the at least one computer to assign available decode resources to the at least one packet based on the estimated decode resource usage by each packet.

33. The computer program product of claim 30, wherein the computer-readable medium further comprises:
code for causing the at least one computer to skip or defer processing of one or more packets among the at least one packet to allow each packet to be processed to meet requirements of each packet; and
code for causing the at least one computer to select the one or more packets to skip or defer processing based on at least one of latency requirements, priority, likelihood of correct decoding, number of transmissions, number of tiles, and size of each packet.

* * * * *